United States Patent
Hetherington et al.

(10) Patent No.: US 6,396,515 B1
(45) Date of Patent: *May 28, 2002

(54) METHOD, SYSTEM AND COMPUTER PROGRAM PRODUCT FOR DYNAMIC LANGUAGE SWITCHING IN USER INTERFACE MENUS, HELP TEXT, AND DIALOGS

(75) Inventors: David James Hetherington, Austin, TX (US); David Bruce Kumhyr, Fuguay-Varina, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/211,798

(22) Filed: Dec. 15, 1998

(51) Int. Cl.$^7$ ................................................. G06F 3/00
(52) U.S. Cl. ...................... 345/762; 345/703; 345/765; 345/866; 704/8
(58) Field of Search ................................ 345/333, 334, 345/349, 335, 703, 765, 866; 704/8; 707/542

(56) References Cited

U.S. PATENT DOCUMENTS

| | | | |
|---|---|---|---|
| 4,730,270 A | * 3/1988 | Okajima et al. | 704/2 |
| 4,870,610 A | * 9/1989 | Belfer | 704/2 |
| 5,091,876 A | * 2/1992 | Kumano et al. | 364/419 |
| 5,127,748 A | * 7/1992 | Okimoto et al. | 400/70 |
| 5,136,504 A | * 8/1992 | Fushimoto | 704/10 |
| 5,243,519 A | 9/1993 | Andrews et al. | |
| 5,251,130 A | 10/1993 | Andrews et al. | |
| 5,416,903 A | * 5/1995 | Malcolm | 345/333 |
| 5,499,335 A | 3/1996 | Silver et al. | |
| 5,586,761 A | 12/1996 | Chou et al. | |
| 5,652,884 A | 7/1997 | Palevich | |
| 5,664,206 A | 9/1997 | Murow et al. | |
| 5,671,378 A | 9/1997 | Acker et al. | |
| 5,675,818 A | 10/1997 | Kennedy | |
| 5,678,039 A | 10/1997 | Hinks et al. | |
| 5,734,597 A | 3/1998 | Molnar et al. | |
| 5,745,643 A | 4/1998 | Mishina | |
| 5,754,173 A | 5/1998 | Hiura et al. | |
| 5,802,539 A | * 9/1998 | Daniels et al. | 707/542 |
| 5,907,326 A | 5/1999 | Akin et al. | |
| 5,917,484 A | 6/1999 | Mullaney | |
| 5,974,372 A | 10/1999 | Barnes et al. | |
| 6,018,344 A | 1/2000 | Harada et al. | |
| 6,073,090 A | 6/2000 | Fortune et al. | |
| 6,185,729 B1 | * 2/2001 | Watanabe et al. | 717/1 |

OTHER PUBLICATIONS

U.S. application No. 09/211,814, Hetherington et al., filed Dec.15, 1998.
U.S. application No. 09/211,816, Hetherington et al., filed Dec.15, 1998.

* cited by examiner

Primary Examiner—Raymond J. Bayerl
Assistant Examiner—Thomas T. Nguyen
(74) Attorney, Agent, or Firm—Marilyn Smith Dawkins; Bracewell & Patterson L.L.P.

(57) ABSTRACT

To facilitate dynamic language switching in a data processing system, software is implemented with user interface text—menu and button labels, dialog messages, help text, etc.—and other language-specific components segregated from underlying functionality. Thus, for example, label and other text-based parameters for Java AWT methods are taken from storage objects separate from the constructor invoking the corresponding Java AWT method. Since Java is dynamically linked at runtime, one or more language-specific files containing all user interface text for an application may be dynamically selected during initialization of the application. The language-specific file selection may be based on the current setting of a language property for the host data processing system. If a language change request is received, the user interface may be reloaded with text supplied from a different language-specific file pursuant to the language change request.

21 Claims, 4 Drawing Sheets

METHOD, SYSTEM AND COMPUTER PROGRAM PRODUCT FOR DYNAMIC LANGUAGE SWITCHING IN USER INTERFACE MENUS, HELP TEXT, AND DIALOGS

RELATED APPLICATIONS

The present invention is related to the subject matter of the following commonly assigned, copending U.S. patent application: Ser. No. 09/211,814 entitled "METHOD, SYSTEM, AND COMPUTER PROGRAM PRODUCT FOR DYNAMIC DELIVERY OF HUMAN LANGUAGE TRANSLATIONS DURING SOFTWARE OPERATION" and filed Dec. 15, 1998; and Ser. No. 09/211,816 entitled "METHOD, SYSTEM, AND DATA STRUCTURE FOR SPLITTING LANGUAGE AND LOCALE PROPERTIES IN A DATA PROCESSING SYSTEM" and filed Dec. 15, 1998. The content of the above-referenced applications is incorporated herein by reference.

BACKGROUND OF THE INVENTION

1. Technical Field

The present invention relates in general to multi-lingual support in data processing systems and in particular to dynamic language switching in data processing systems providing multilingual support. Still more particularly, the present invention relates to segregating user interface text from underlying functionality to facilitate dynamic language switching in data processing systems providing multilingual support.

2. Description of the Related Art

Multinational companies often run information system (IS) networks which span multiple countries spread around the globe. To maximize the usefulness of such networks, operations within each country tend to run in the local language of the country. This is also the case where the networks of a single enterprise are regionally fragmented rather than interlinked. Where possible, text in user applications are in the local language.

Problems arise, however, when the enterprise assigns a staff member, usually temporarily, to a region in which the indigenous language is not one in which the staff member reads or understands, or when the enterprise attempts to establish central management of a global network. In such situations, users or system administrators may not be able to understand the user interface text—menu and control labels, dialog messages, help text, and the like—for an application which they must utilize in order to perform the task(s) assigned to them. For example, applications running on a system located in Egypt would most likely include user interface text and abstract object names (file names, user names, etc.) in Arabic; systems in Russia would utilize text and object names having Cyrillic characters; and for systems in Japan would employ Kanji symbols for user interface text and object names. A visiting staff member, or the IS staff at the multinational headquarters located in the United States, will frequently be able to read Arabic, Cyrillic, or Japanese.

Language is conventionally integrated into the software user interface, and is essentially inextricable for software which is fully compiled prior to distribution. Even for software in environments which employ an intermediate, text-based representation which is dynamically compiled and linked at run time, such as Java, human language text for user interface displays and objects names is typically integrated into the underlying operational software. This requires different software versions for operation in different languages, and switching between languages thus requires running different executable versions of the desired software.

As a result of the conventional integration of language within operational software, a user wishing to operate an application or system in a language other than that currently set for that system must shut down the application and open a different language version of the same application, or alter an operating system setting and "bounce" the system (reboot or reinitialize) to change the operating system. In many situations, such practices are either not viable or not acceptable.

It would be desirable, therefore, to provide support for switching the language employed for text within a user interface without requiring an application to be closed and a different executable version to be started or the operating system to be bounced.

SUMMARY OF THE INVENTION

It is therefore one object of the present invention to provide an improved method, system and computer program product for multilingual support in data processing systems.

It is another object of the present invention to provide a method, system and computer program product for dynamic language switching in data processing systems providing multilingual support.

It is yet another object of the present invention to provide a method, system and computer program product for segregating user interface text from underlying functionality to facilitate dynamic language switching in data processing systems providing multilingual support.

The foregoing objects are achieved as is now described. To facilitate dynamic language switching in a data processing system, software is implemented with user interface text—menu and button labels, dialog messages, help text, etc.—and other language-specific components segregated from underlying functionality. Thus, for example, label and other text-based parameters for Java AWT methods are taken from storage objects separate from the constructor invoking the corresponding Java AWT method. Since Java is dynamically linked at runtime, one or more language-specific files containing all user interface text for an application may be dynamically selected during initialization of the application. The language-specific file selection may be based on the current setting of a language property for the host data processing system. If a language change request is received, the user interface may be reloaded with text supplied from a different language-specific file pursuant to the language change request.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjuction with the accompanying drawings, wherein:

DETAILED DESCRIPTION OF THE PREFERRED EMBODIMENT

Figure 1:
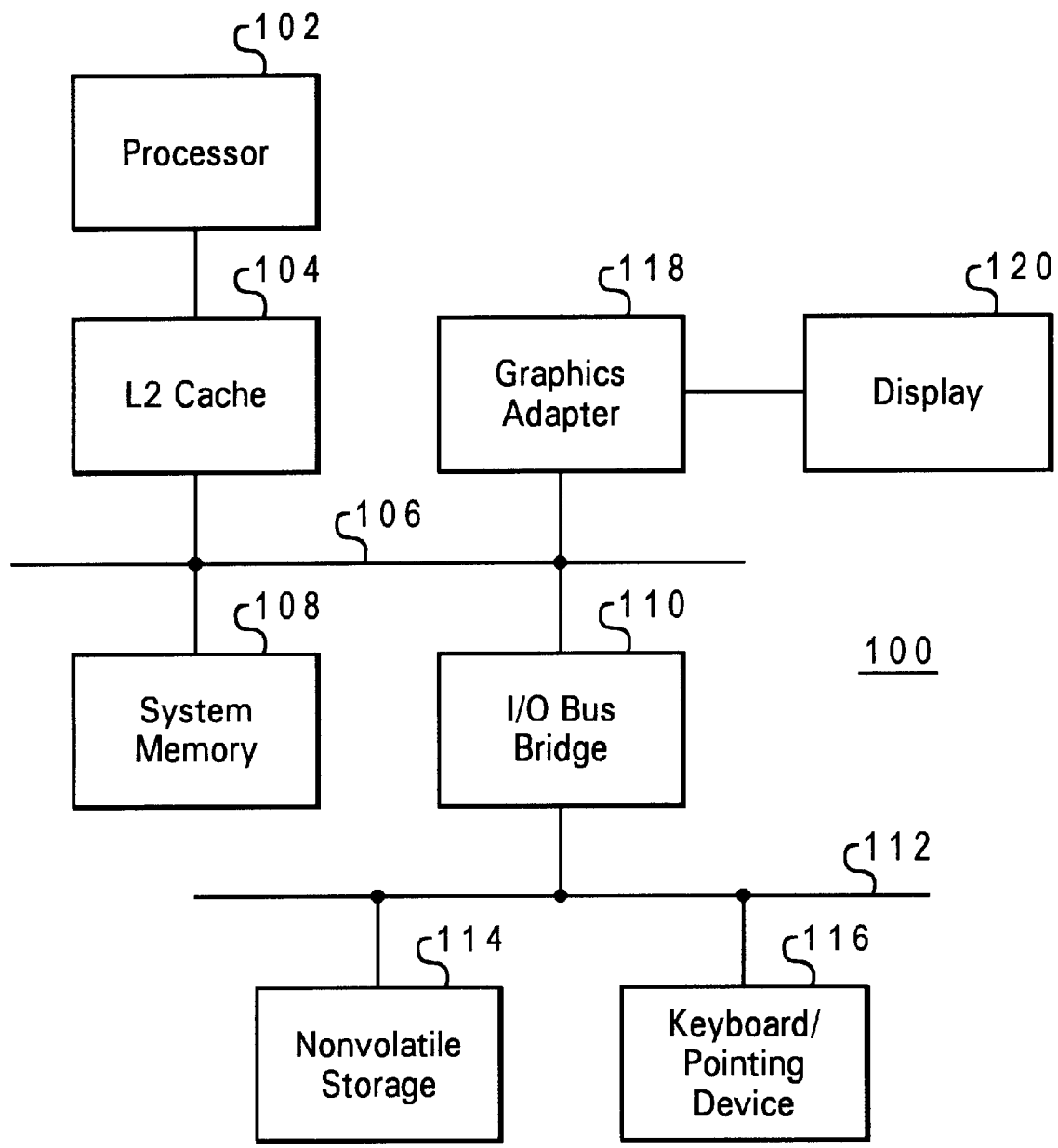
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 may be, for example, one of the Aptiva® models of personal computers available from International Business Machines Corporation of Armonk, N.Y. Data processing system 100 includes a processor 102, which in the exemplary embodiment is connected to a level two (L2) cache 104, which is connected in turn to a system bus 106. In the exemplary embodiment, data processing system 100 includes graphics adapter 118 connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital versatile disk (DVD) drive, a sound card and audio speakers, and numerous other optional components. All such variations are believed to be within the spirit and scope of the present invention. Data processing system 100 and the Java implementation examples below are provided solely as examples for the purposes of explanation and are not intended to imply architectural limitations. Those skilled in the art will recognize the numerous programming languages which may be utilized, all of which are believed to be embraced within the spirit and scope of the invention.

Figure 2A:
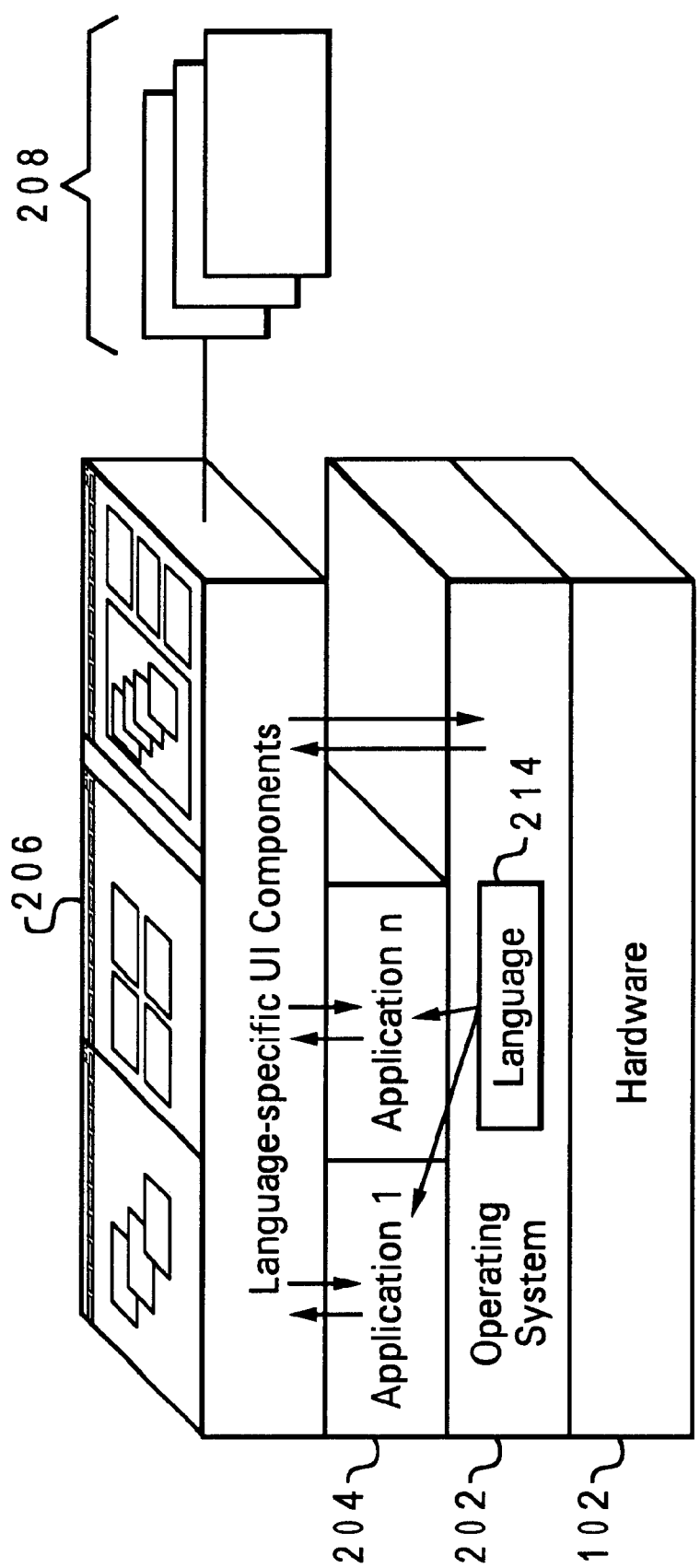
FIGS. 2A and 2B–2D are diagrams of layering or segregating operational and language-specific portions of a software program to facillitate dynamic language switching in accordance with a preferred embodiment of the present invention.

Referring to FIG. 2A, a diagram of layering operational and language-specific portions of a software program to facilitate dynamic language switching in accordance with a preferred embodiment of the present invention is illustrated. As is known in the art, an operating system 202 runs on data processing system 100, and applications 204 run on operating system 202. Applications 204 typically include one or more user interface components (menus, dialogs, help files, buttons, etc.) employing text labels.

To facilitate dynamic language switching, all user interface text and other language-specific user interface components 206—e.g., menus, dialog box messages, help text, etc.—is separated from the operation of the software in the present invention. The user interface text is distinct from the working text of an application (that is, text entered by a user). Language-specific components 206 are selected from a library 208 of different versions of the language-specific components for various languages. In some cases, the layering of language-specific components 206 from the underlying functionality may extend to user interface text for operating system 202 as well as for the user interface of applications 204. This layering of language-specific UI components 206 from the underlying applications 204 and/or operations system 202 functionality permits the language for the software user interface to be changed dynamically, while a program is running.

Only the presentation of the information within the user interface is changed, while the information itself and the format remain the same. Thus, for example, different system administrators may each choose whichever language they prefer during run time, so that German system administrators could select menus in German while Japanese system administrators select menus in Japanese even though both are working on the same system and looking at the same system status information. Additionally, the working text language is not necessarily affected by changes to the user interface text, so that a user may be working in one language (e.g., English) with the user interface being in a second language (e.g., Japanese).

With the present invention, changes in user interface text may be achieved dynamically without shutting down the underlying application, and in particular without requiring that a separate executable version of the application be employed. This allows users to change user interface display languages on the fly, and permits multiple users of an application to change the display language.

The layering of language-specific UI text and components from underlying operation may be readily extended to an application environment or operating system 204. This permits different users to operate the same system in different languages without "bouncing" (shutting down and then rebooting) the system by dynamically changing the language in which user interface text is displayed.

Figure 2B:
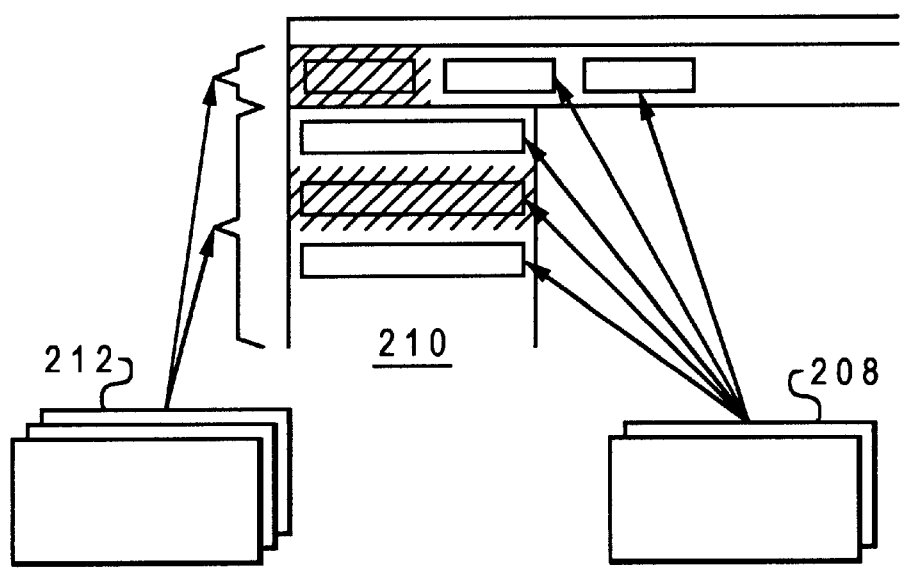
Figure 2C:
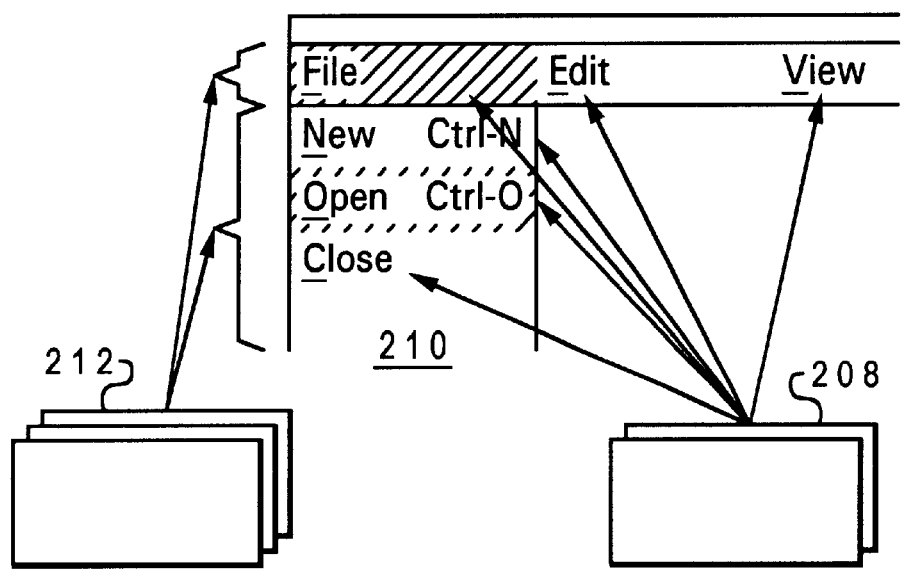
Figure 2D:
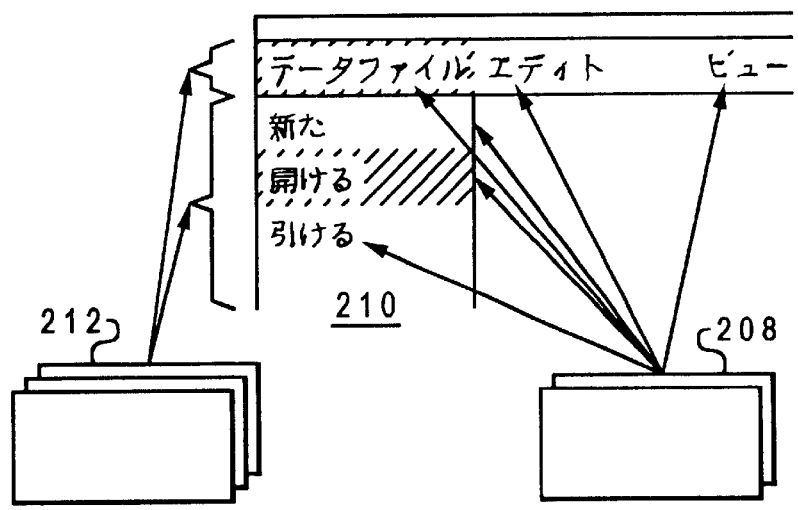

FIGS. 2B through 2D are diagrams illustrating how user-interface text may be separated from underlying operational functionality in accordance with the present invention. A user interface 210 includes menus which are established and formatted by a first set of objects or constructors 212. The text for those menus, however, is obtained from a separate set of objects or constructors 208.

This separation of user interface text from user interface functionality is readily achieved in, for example, Java. The Java Abstract Windowing Toolkit (AWT) includes methods which may be invoked to create a user interface menu item. The Java menu( label ) method creates a menu item labeled with the text provided as the parameter "label." Instead of including the label parameter within the constructor invoking the menu() method, the label may be placed as a field within a constructor for a data object containing the text for the label. Thus, for instance, a reference to MenuLabels.FIRST may be employed as a parameter for invoking the menu method, where "first" is a field within the object "MenuLabels" containing the text for the corresponding menu item. The text from such a separate storage object 208 is then combined with the menu items from operational objects 212 to generate user interface display 210 as shown in FIGS. 2C–2D.

Java also includes methods for displaying dialogs, buttons, help text, and other text-based user interface components. The textual parameters for such methods may similarly be derived from a separate, language-specific object. Since Java is dynamically linked at run-time, the appropriate user-interface text-storage object version may be selected at run time from a library of resource files.

Referring back to FIG. 2A, operating system 202 may include a language or "regional setting" property or variable 214 as shown. Property 214 may contain either an uppercase, two letter ISO Country Code as defined by ISO-3166 or a lower-case, two letter ISO Language Code as defined by ISO-639, or both. User interface text files 208 may be selected based on the content of property 214. Changing property 214 may cause user interface components registered as subscribers for language change request notification to reload with different human-language text drawn from a different UI text storage object 208, dynamically changing the UI display language.

Although illustrated in the context of Java, the present invention may be implemented within software written in a programming language which is fully compiled and linked prior to distribution. The user interface text should be implemented within separate software components, such as a dynamic-link library (DLL) file, for example, which are selected and loaded at run time. Additionally, even within software written in Java or similar languages, separate entire constructors may be implemented for user interface components rather than merely separate UI text storage objects.

Figure 3:
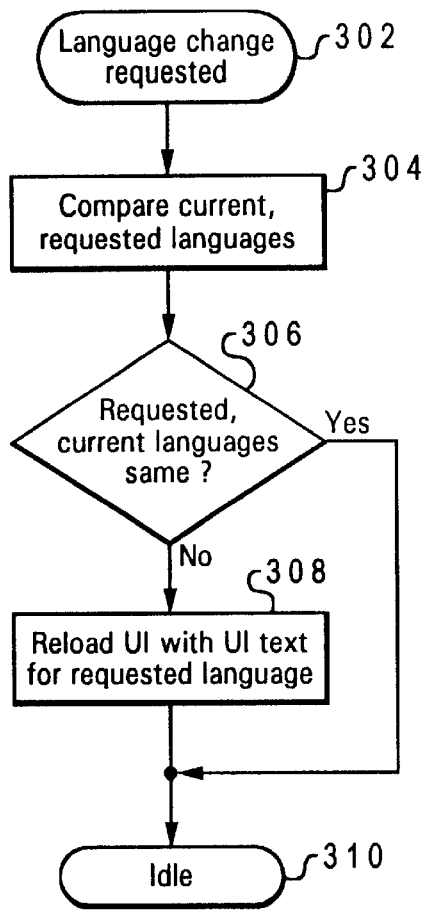
FIG. 3 depicts a high level flowchart for a process of dynamically changing user interface text in accordance with a preferred embodiment of the present invention.

With reference now to FIG. 3, a high level flowchart for a process of dynamically changing user interface text in accordance with a preferred embodiment of the present invention is depicted. The process begins at step 302, which illustrates a language change request being received. This may correspond to a change in a language property setting as described above.

The process next passes to step 304, which illustrates comparing the requested language to the current language, and then to step 306, which depicts a determination of whether the requested and current languages are the same. If so, the process proceeds to step 308, which illustrates reloading the user interface with user interface text for the requested language. If not, however, or upon successfully reloading the user interface, the process proceeds to step 310, which illustrates the process becoming idle until another language change request is received.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of providing user interface text, comprising:
   segregating user interface text for a software program from one or more operational components containing a human language-independent functionality for the software program;
   providing, in addition to the operational components, at least one set of user interface text components containing all required user interface text for the software program; and
   responsive to execution of the software program, selecting a set of user interface text components for a desired human language.

2. The method of claim 1, wherein the step of segregating user interface text for a software program from one or more operational components containing a human language-independent functionality for the software program further comprises:
   defining menu labels, button labels, dialog messages and help text in software components separate from functional components for forming menu items, buttons, dialogs, and help displays within a user interface.

3. The method of claim 1, wherein the step of providing, in addition to the operational components, at least one set of user interface text components containing all required user interface text for the software program further comprises:
   providing a plurality of sets of user interface components, each set containing user interface text in a different human language.

4. The method of claim 1, wherein the step of selecting a set of user interface text components for a desired human language further comprises:
   selecting the set of user interface components based on a language property setting within a host data processing system on which the software program is executing.

5. The method of claim 1, wherein the step of selecting a set of user interface text components for a desired human language further comprises:
   determining an ISO-3166 code for the desired human language.

6. The method of claim 1, wherein the step of selecting a set of user interface text components for a desired human language further comprises:
   determining an ISO-639 code for the desired human language.

7. The method of claim 1, further comprising:
   responsive to a language change request:
      selecting a new set of user interface text components for a requested human language; and
      reloading a user interface utilizing the new set of user interface text components.

8. A system for dynamic language switching, comprising:
   means for segregating user interface text for a software program from one or more operational components containing a human language-independent functionality for the software program;
   means for providing, in addition to the operational components, at least one set of user interface text components containing all required user interface text for the software program; and
   means, responsive to execution of the software program, for selecting a set of user interface text components for a desired human language.

9. The system of claim 8, wherein the means for segregating user interface text for a software program from one or more operational components containing a human language-independent functionality for the software program further comprises:
   means for defining menu labels, button labels, dialog messages and help text in software components separate from functional components for forming menu items, buttons, dialogs, and help displays within a user interface.

10. The system of claim 8, wherein the means for providing, in addition to the operational components, at least one set of user interface text components containing all required user interface text for the software program further comprises:

means for providing a plurality of sets of user interface components, each set containing user interface text in a different human language.

11. The system of claim 8, wherein the means for selecting a set of user interface text components for a desired human language further comprises:

means for selecting the set of user interface components based on a language property setting within a host data processing system on which the software program is executing.

12. The system of claim 8, wherein the means for selecting a set of user interface text components for a desired human language further comprises:

means for determining an ISO-3166 code for the desired human language.

13. The system of claim 8, wherein the means for selecting a set of user interface text components for a desired human language further comprises:

means for determining an ISO-639 code for the desired human language.

14. The system of claim 8, further comprising:

means, responsive to a language change request:
for selecting a new set of user interface text components for a requested human language; and
for reloading a user interface utilizing the new set of user interface text components.

15. A computer program product within a computer usable medium for dynamic language switching, comprising:

instructions for segregating user interface text for a software program from one or more operational components containing a human language-independent functionality for the software program;

instructions for providing, in addition to the operational components, at least one set of user interface text components containing all required user interface text for the software program; and instructions, responsive to execution of the software program, for selecting a set of user interface text components for a desired human language.

16. The computer program product of claim 15, wherein the instructions for segregating user interface text for a software program from one or more operational components containing a human language-independent functionality for the software program further comprises:

instructions for defining menu labels, button labels, dialog messages and help text in software components separate from functional components for forming menu items, buttons, dialogs, and help displays within a user interface.

17. The computer program product of claim 15, wherein the instructions for providing, in addition to the operational components, at least one set of user interface text components containing all required user interface text for the software program further comprises:

instructions for providing a plurality of sets of user interface components, each set containing user interface text in a different human language.

18. The computer program product of claim 15, wherein the instructions for selecting a set of user interface text components for a desired human language further comprises:

instructions for selecting the set of user interface components based on a language property setting within a host data processing system on which the software program is executing.

19. The computer program product of claim 15, wherein the instructions for selecting a set of user interface text components for a desired human language further comprises:

instructions for determining an ISO-3166 code for the desired human language.

20. The computer program product of claim 15, wherein the instructions for selecting a set of user interface text components for a desired human language further comprises:

instructions for determining an ISO-639 code for the desired human language.

21. The computer program product of claim 15, further comprising:

instructions, responsive to a language change request:
for selecting a new set of user interface text components for a requested human language; and
for reloading a user interface utilizing the new set of user interface text components.

* * * * *